United States Patent
Goutal

(10) Patent No.: US 10,142,366 B2
(45) Date of Patent: Nov. 27, 2018

(54) METHODS, SYSTEMS AND DEVICES TO MITIGATE THE EFFECTS OF SIDE EFFECT URLS IN LEGITIMATE AND PHISHING ELECTRONIC MESSAGES

(71) Applicant: Vade Retro Technology Inc., San Francisco, CA (US)

(72) Inventor: Sebastien Goutal, Gravigny (FR)

(73) Assignee: VADE SECURE, INC., San Francisco, CA (US)

( * ) Notice: Subject to any disclaimer, the term of this patent is extended or adjusted under 35 U.S.C. 154(b) by 259 days.

(21) Appl. No.: 15/070,479

(22) Filed: Mar. 15, 2016

(65) Prior Publication Data
US 2017/0272464 A1  Sep. 21, 2017

(51) Int. Cl.
*H04L 29/06* (2006.01)
*H04L 12/58* (2006.01)

(52) U.S. Cl.
CPC ........ *H04L 63/1483* (2013.01); *H04L 51/063* (2013.01); *H04L 51/18* (2013.01)

(58) Field of Classification Search
CPC ... H04L 63/1483; H04L 51/063; H04L 51/18; H04L 63/1425; H04L 51/12; H04L 41/0293; H04L 67/02; H04L 63/1466; G06F 21/606
USPC .............................. 726/22–23; 709/224, 225
See application file for complete search history.

(56) References Cited

U.S. PATENT DOCUMENTS

| | | | |
|---|---|---|---|
| 5,890,171 A | 3/1999 | Blumer et al. | |
| 7,412,539 B2 | 8/2008 | Gmuender et al. | |
| 7,424,616 B1 | 9/2008 | Brandenburg et al. | |
| 7,562,387 B2 | 7/2009 | Nguyen et al. | |
| 7,752,336 B2 | 7/2010 | Gmuender et al. | |
| 7,827,254 B1 * | 11/2010 | Nevill-Manning | H04L 67/02 709/217 |
| 7,873,707 B1 | 1/2011 | Subramanian et al. | |
| 7,958,555 B1 | 6/2011 | Chen et al. | |
| 7,987,237 B2 | 7/2011 | Matsuura | |
| 8,073,829 B2 | 12/2011 | Lopez et al. | |

(Continued)

OTHER PUBLICATIONS

Rami M. Mohammad, Intelligent Rule based Phishing Websites Classification, IET Information Security, 2013.*

(Continued)

*Primary Examiner* — Shanto Abedin
(74) *Attorney, Agent, or Firm* — Young Law Firm, P.C.

(57) ABSTRACT

A computer-implemented method may comprise receiving an electronic message (such as a legitimate email or malicious phishing email, for example) over a computer network, the electronic message containing a uniform resource locator (URL). The URL in the received electronic message may be parsed and one or more original parameter may be identified therein. The type of the identified original parameter(s) may be determined. The identified original parameter(s) may then be transformed according to a parameter transformation rules, selected according to the determined type. to generate transformed parameter(s). The URL may then be reassembled by substituting the transformed parameter(s) for the original parameter(s). The website pointed to by the reassembled URL may then be accessed, over the computer network, using the transformed parameter(s) only if the reassembled URL meets a predetermined minimum criterion.

21 Claims, 6 Drawing Sheets

(56) References Cited

U.S. PATENT DOCUMENTS

| | | | |
|---|---|---|---|
| 8,079,087 B1 | 12/2011 | Spies | |
| 8,095,530 B1* | 1/2012 | Lloyd | G06F 7/02 |
| | | | 707/664 |
| 8,095,967 B2 | 1/2012 | Loesh et al. | |
| 8,135,790 B1 | 3/2012 | Castelli | |
| 8,307,431 B2 | 11/2012 | Krishnamurthy et al. | |
| 8,336,092 B2 | 12/2012 | Nagoya et al. | |
| 8,429,301 B2 | 4/2013 | Gmuender et al. | |
| 8,438,642 B2 | 5/2013 | Fang et al. | |
| 8,448,245 B2 | 5/2013 | Banerjee et al. | |
| 8,468,597 B1 | 6/2013 | Warner | |
| 8,521,667 B2 | 8/2013 | Zhu et al. | |
| 8,528,079 B2 | 9/2013 | Wang | |
| 8,601,586 B1* | 12/2013 | Boutros | H04L 63/1433 |
| | | | 709/217 |
| 8,621,614 B2 | 12/2013 | Vaithilingam et al. | |
| 8,646,067 B2 | 2/2014 | Agarwal et al. | |
| 8,667,146 B2 | 3/2014 | Agarwal et al. | |
| 8,701,185 B2 | 4/2014 | Krishnamurthy et al. | |
| 8,776,224 B2 | 7/2014 | Krishnamurthy et al. | |
| 8,799,515 B1 | 8/2014 | Wu | |
| 8,838,973 B1 | 9/2014 | Yung et al. | |
| 8,874,658 B1 | 10/2014 | Khalsa et al. | |
| 9,058,487 B2 | 6/2015 | Feng et al. | |
| 9,083,733 B2 | 7/2015 | Georgiev | |
| 9,094,365 B2 | 7/2015 | Gmuender et al. | |
| 9,210,189 B2 | 12/2015 | Dong et al. | |
| 9,276,956 B2 | 3/2016 | Geng et al. | |
| 9,332,022 B1* | 5/2016 | Ashley | H04L 63/1408 |
| 2005/0228899 A1 | 10/2005 | Wendkos et al. | |
| 2006/0117307 A1 | 6/2006 | Averbuch | |
| 2007/0078936 A1 | 4/2007 | Quinlan | |
| 2007/0283000 A1* | 12/2007 | Proux | H04L 51/12 |
| | | | 709/224 |
| 2008/0133672 A1 | 6/2008 | Gillum | |
| 2008/0141342 A1 | 6/2008 | Curnyn | |
| 2010/0186088 A1* | 7/2010 | Banerjee | G06F 21/51 |
| | | | 726/23 |
| 2010/0251366 A1* | 9/2010 | Baldry | G06F 21/6218 |
| | | | 726/22 |
| 2010/0251380 A1 | 9/2010 | Zhang | |
| 2012/0158626 A1 | 6/2012 | Zhu | |
| 2012/0259933 A1* | 10/2012 | Bardsley | G06Q 30/06 |
| | | | 709/206 |
| 2013/0086677 A1 | 4/2013 | Ma | |
| 2013/0238721 A1 | 9/2013 | Patel | |
| 2014/0082521 A1 | 3/2014 | Carolan et al. | |
| 2014/0298460 A1 | 10/2014 | Xue | |
| 2015/0264082 A1* | 9/2015 | Belva | H04L 63/1466 |
| | | | 726/25 |

OTHER PUBLICATIONS

Marco Cova, Christopher Kruegel, and Giovanni Vigna—There is No Free Phish: An Analysis of "Free" and Live Phishing Kits—Department of Computer Science, University of California, Santa Barbara, 2008, downloaded from https://www.usenix.org/legacy/event/woot08/tech/full_papers/cova/cova_html/ on Jun. 24, 2016.

Heather McCalley, Brad Wardman and Gary Warner—Chapter 12, Analysis of Back-Doored Phishing Kits; G. Peterson and S. Shenoi (Eds.): Advances in Digital Forensics VII, IFIP AICT 361, pp. 155-168, 2011. c IFIP International Federation for Information Processing 2011.

Tyler Moore and Richard Clayton—Discovering Phishing Dropboxes Using Email Metadata, Pre-publication copy, Nov. 2012. To appear in the proceedings of the 7th APWG eCrime Researchers Summit (eCrime).

USPTO Office Action dated Apr. 1, 2016 in U.S. Appl. No. 14/542,939.

USPTO Office Action dated Dec. 6, 2016 in U.S. Appl. No. 14/861,846.

RFC 2616—https://tools.ietf.org/html/rfc2616, downloaded Mar. 15, 2016.

RFC 3986—https://tools.ietf.org/html/rfc3986, downloaded Mar. 15, 2016.

Wikipedia—https://en.wikipedia.org/wiki/Regular_expression, downloaded Mar. 15, 2016.

* cited by examiner

| Victim | Phishing url |
|---|---|
| john.doe@gmail.com | http://phishingdomain.com/paypal/08f912ef567d-afe5/ |
| john.smith@yahoo.co.uk | http://phishingdomain.com/paypal/fe56a78d90ec-d455/ |
| jane.doe@aol.com | http://phishingdomain.com/paypal/ae5e6901dfef-09fe/ |
| ... | ... |

FIG. 1

| | |
|---|---|
| legitimate url | https://domain.com/sh/ywkb9d5j0a143zd/AAB1mlGiOp0dJm1YPkmu7G16a |
| rewritten url | https://domain.com/sh/Zsd0pEVVVFMgzM/ICAgd2QgOHF3N2QgaXF3dSBkO |
| legitimate url | http://domain.com/?p=unsubscribe&user=442957947&nl=59840501 |
| rewritten url | http://domain.com/?p=wdfeujkopes&user=981604531&nl=79310273 |
| legitimate url | http://domain.com/confirm/?auth=john.doe@gmail.com |
| rewritten url | http://domain.com/confirm/?auth=arzt.wlo@jklnw.com |
| legitimate url | http://domain.com/ga/fcb9105b2faed91-346abd4177 |
| rewritten url | http://domain.com/ga/eb3489d9ea217f3-c45d90034f |
| phishing url | http://phishingdomain.com/paypal/08f912ef567d-afe5/ |
| rewritten url | http://phishingdomain.com/paypal/45ed7891ac50-cc78/ |

FIG. 2

| Parameter type | Description | Example |
|---|---|---|
| BASE10 | One or several sequence(s) of decimal numbers | 442957947 |
| | | 156349-8890 |
| LCBASE16 | One or several sequence(s) of lowercase hexadecimal characters | 08f912ef567d-afe5 |
| UCBASE16 | One or several sequence(s) of uppercase hexadecimal characters | DE4518F90331DA59 |
| | | FE34_541E_092A_9FE4 |
| BASE64 | One or several sequence(s) of base 64 encoded data i.e. a combination of lowercase letters, uppercase letters and numbers | AAB1mlGiOp0dJm1YPkmu7G16a |
| LCWORDS | One or several sequence(s) of lowercase letters | dallas |
| UCWORDS | One or several sequence(s) of uppercase letters | UNSUB_NL |
| LCEMAILADDR | A lowercase email address | john.doe@gmail.com |
| UCEMAILADDR | An uppercase email address | JOHNSMITH1@YAHOO.COM |

FIG. 3

| url | http://domain.com/?p=unsubscribe&user=442957947&nl=59840501 |
|---|---|
| parameter #1 (LCWORDS) | unsubscribe |
| parameter #2 (BASE10) | 442957947 |
| parameter #3 (BASE10) | 59840501 |

*FIG. 4*

| url | http://domain.com/e/t/?cM3CUsu4Rie0 |
|---|---|
| parameter #1 (BASE64) | cM3CUsu4Rie0 |

*FIG. 5*

| url | https://domain.com/sh/ywkb9d5j0u143zd/AAB1mlGiOp0dJm1YPkmu7G16a |
|---|---|
| parameter #1 (BASE64) | ywkb9d5j0u143zd |
| parameter #2 (BASE64) | AAB1mlGiOp0dJm1YPkmu7G16a |

*FIG. 6*

| Parameter type | Transformation rule | Example (rewritten parameter in italic) |
|---|---|---|
| BASE10 | Replace each number by a random number. | 156349-8890 *780034-9134* |
| LCBASE16 | Replace each lowercase hexadecimal character by a random lowercase hexadecimal character. | 08f912ef567d-afe5 *e6782ad3210d-e450* |
| UCBASE16 | Replace each uppercase hexadecimal character by a random uppercase hexadecimal character. | DE4518F90331DA59 *F4509EB673AEF891* |
| BASE64 | Replace each lowercase letter, uppercase letter or number by a random lowercase letter, uppercase letter or number. | AAB1mlGiOp0dJm1YPkmu7G16a *we6RtG9euI9OPwZ7gtRyyAP90* |
| LCWORDS | Replace each lowercase letter by a random lowercase letter. | dallas *ernqzw* |
| UCWORDS | Replace each uppercase letter by a random uppercase letter. | UNSUB_NL *YNHJA_QQ* |
| LCEMAILADDR | Replace each lowercase letter by a random lowercase letter. Exception: Top Level Domain that shall remain intact | john.doe@gmail.com *rtax.erk@wzppo.com* |
| UCEMAILADDR | Replace each uppercase letter by a random uppercase letter. Exception: Top Level Domain that shall remain intact | JOHNSMITH1@YAHOO.COM *IKPQEERGC1@SIKAP.COM* |

*FIG. 7*

METHODS, SYSTEMS AND DEVICES TO MITIGATE THE EFFECTS OF SIDE EFFECT URLS IN LEGITIMATE AND PHISHING ELECTRONIC MESSAGES

CROSS-REFERENCE TO RELATED APPLICATIONS

The present application is related in subject matter to commonly-owned and co-pending U.S. application Ser. No. 14/542,939 filed on Nov. 17, 2014 entitled "Methods and Systems for Phishing Detection", which is incorporated herein by reference in its entirety. The present application is also related in subject matter to commonly-owned and co-pending U.S. application Ser. No. 14/861,846 filed on Sep. 22, 2015 entitled "Detecting and Thwarting Spear Phishing Attacks in Electronic Messages", which is also incorporated herein by reference in its entirety. The present application is also related in subject matter to commonly-owned and co-pending U.S. application Ser. No. 15/063,340 filed on Mar. 7, 2016 entitled "Methods and Devices to Thwart Email Display Name Impersonation", which is also incorporated herein by reference in its entirety.

BACKGROUND

Phishing is now a persistent threat in the email ecosystem. Much effort has been expended recently by security vendors and mailbox providers to thwart this threat. A phishing attack always relies on a Universal Resource Locator (URL) that leads the unsuspecting user to a phony website. Indeed, the side effect URL is the cornerstone of a phishing attack.

BRIEF DESCRIPTION OF THE DRAWINGS

FIG. 1 is a table illustrating aspects of generating a unique side effect URL for each individually-targeted email recipient.

FIG. 2 is a table that includes examples of rewritten side effect URLs, according to one embodiment FIG. 3 shows a number of identified main types of parameters, according to one embodiment.

FIG. 4 is a table showing an example of a side effect URL having a series of three field and value pairs.

FIG. 5 is a table showing an example of a side effect URL having a single value.

FIG. 6 is a table of a side effect URL having two parameters.

FIG. 7 is a table that show a plurality of parameter rewriting rules, according to one embodiment.

DETAILED DESCRIPTION

Figure 8:
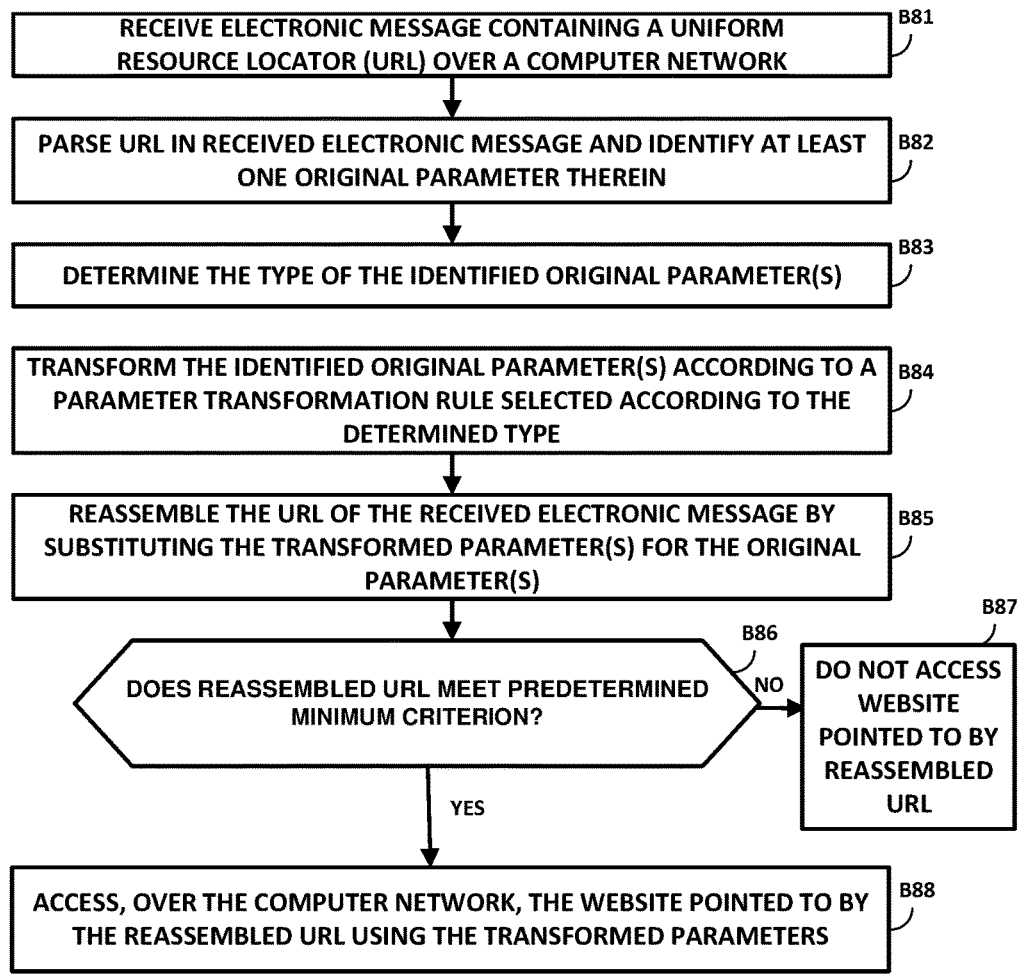
FIG. 8 is a flowchart illustrating aspects of a method, according to one embodiment.

Phishing attacks may be detected by analyzing the URLs contained in emails using, for example, fingerprint, machine learning and rule-based techniques, to name a few possibilities. Such techniques rely on the extraction of data and features from the URL and the webpage associated with this URL. Technically speaking, however, analyzing a webpage in this manner requires the sending a HTTP GET request, the response to which may lead to and cause unwanted effects. Such unwanted effects may include, for example:

Subscribing or unsubscribing from a newsletter,
Confirming, updating or canceling an order, a flight or a reservation,
Resetting a password, and the like.

Herein, such URLs are called side effect URLs, for the unwanted and potentially destructive side effects clicking on such a URL may have for the user. One embodiment detects and identifies side effect URLs, before the webpage pointed to by the side effect URL is accessed and analyzed. It has been determined that side effect URLs always or most always contain one or more parameters that lead to the aforementioned unwanted and malicious side effects. For example, such parameters may include:

a user identifier,
a newsletter identifier,
an order identifier,
a flight identifier,
a reservation identifier,
an account identifier, and the like.

Furthermore, these parameters may be encrypted, making their detection all the more challenging. These URL parameters, which may lead to unwanted and malicious side effects, may be passed in two different ways:

In the query string of the URL, and/or
In the path of the URL.

URLs are generally formatted as follows:

scheme: [//[user:password@]host[:port]][/]path[?query][#fragment]

Parameters in the Query String

Below are several examples of side effect URLs with original parameters (highlighted in bold) located in the query string:

http://domain.com/?p=unsubscribe&user=442957947&nl=59840501
http://domain.com/confirm/?auth=john.doe@gmail.com
http://domain.com/e/t/?e6b741847a636e44c8fa0304f7729f1d99

Note that the original parameters follow the question mark "?" at the end of the path.

Parameters in the Path

Below are several examples of side effect URLs with original parameters (highlighted in bold) located in the URL's path:

http://domain.com/k/105396/wi/a27c9e848245d
http://domain.com/ga/fcb9105b2faed91-346abd4177
https://domain.com/sh/ywkb9d5j0u143zd/AAB1mlGiOp0dJm1YPkmu7G16a Security vendors and mailbox providers use different techniques to detect side effect URLs. If a side effect URL is detected, the webpage associated to this URL will not be analyzed.

A growing number of phishers (senders of phishing emails) are now aware of side effect URLs. As a consequence, phishers may include parameters in their phishing URLs in order to evade URL analysis technologies. For example, one technique is to generate a unique phishing URL for each victim, as described in FIG. 1.

As shown, a unique phishing URL for John Doe's gmail account email address may be (original parameters shown in bold):

john.doe@gmail.com http://phishingdomain.com/paypal/08f912ef567d-afe5/

Similarly, another unique phishing URL may be generated for John Smith's UK yahoo email address as follows (original parameters shown in bold):

john.smith@yahoo.co.uk http://phishingdomain.com/paypal/fe56a78d90ec-d455/

Lastly, unique phishing URL may be generated for Jane Doe's aol email address as follows (original parameters shown in bold):

jane.doe@aol.com http://phishingdomain.com/paypal/ae5e6901dfef-09fe/

Consider the following phishing URL template:
http://phishingdomain.com/paypal/%12x-%4x/

In this phishing URL template, %12x stands for 12 lowercase hexadecimal characters and %4x for 4 lowercase hexadecimal characters. Based on this phishing template, the phisher may generate the phishing URLs shown in FIG. 1, with the original parameters in the path of the side effect URL.

Existing URL analysis technologies will not analyze these URLs because they are considered to be side effect URLs, the analysis of which may cause undesirable side effects. Consequently, the phishing threat will not be detected and the victims will receive the phishing emails in their mailbox.

Responsive to this continuing need to successfully and effectively address the issue of side effect URLs, one embodiment transforms (e.g., rewrites) side effect URLs, which may have two impacts:

Legitimate side effect URLs (i.e., those URLs sent by legitimate vendors with whom the recipient has or may want a legitimate relationship) will be rewritten and become harmless. Analysis of these URLs will generally lead to an error because the transformed parameters (user id, newsletter id, order id . . . ) will be considered as invalid by the website. The transformed parameters may be considered to be invalid because parameters are often encrypted so that unauthorized entities are note able to create valid parameters. As a result, the transformed parameter will be considered as invalid and the website will return an error, typically a HTTP 4xx client error. Also, if there is no parameter encryption, then the website will not find valid data when it looks up in the database, because the transformed (e.g., rewritten) parameters (user id, newsletter id, order id . . . ) now refers or point to non-existing data. In this case also, the website is likely to also return an error, such as a HTTP 4xx client error.

Phishing side effect URLs will be transformed (e.g., rewritten). Analysis of these URLs will generally still lead to the phishing webpage, because the phishing URLs are usually generated on the fly when the phishing email campaign is sent. The transformed phishing URLs will be generated from or may be configured to conform to a phishing URL template or one or several randomly generated parameters. The randomly generated parameters are very rarely encrypted for simplicity and performance reasons. Moreover, the randomly generated parameters are never stored on the phishing website and the computer hosting the phishing website and the computer sending the phishing campaign are often separate and dissociated.

In practice, when a user clicks on a side effect URL, the only verification that may be carried out by the phishing website is that it will ensure that the URL parameters match the format defined in the phishing URL template. This verification can be easily made on the phishing website, thanks to regular expressions. For this reason, every effort is made, in the embodiments shown and described herein, for the transformed and reassembled URLs to respect the original format of side effect URLs.

According to one embodiment, a side effect URL may be transformed by:
1. extracting parameters from the query string of the URL;
2. extracting parameters from the path of the URL;
3. determining a type of each of the parameters extracted from the query string of the URL or from the path of the URL;
4. transforming each extracted original parameter according to its determined type into transformed parameters; and
5. re-assembling the side effect URL utilizing the transformed parameters;
6. checking if the re-assembled ULR meets predetermined minimum criterion (according to one embodiment, "enough entropy"). If this is the case, the URL re-assembled using the transformed parameters may be analyzed. Otherwise, the reassembled URL should not be analyzed.

Examples of reassembled side effect URLs, according to one embodiment, are shown in FIG. 2. These rewritten URLs have enough entropy and thus the analysis of a rewritten legitimate URL may be carried out and should not lead to unwanted side effects. According to one embodiment, "enough entropy" in this context means that the probability that a rewritten legitimate URL will cause unwanted side effects is extremely low. Herein, "enough entropy" is analogous to a selected predetermined minimum criterion. Entropy, in this context, is linked with the quantity of data that has been rewritten.

Consider the following example.

Legitimate url: http://domain.com/ga/fcb9105b2faed91-346abd4177

Rewritten url: http://domain.com/ga/eb3489d9ea217f3-c45d90034f

In this example, 25 hexadecimal characters have been rewritten. The number of combination of 25 hexadecimal characters is $16^{25}$=1,267,650,600,228,229,401,496,703,205,376. This number by far exceeds largely the number of users, newsletters, orders and so forth managed by even the largest websites. Indeed, consider the following use statistics of some of the more popular websites: Amazon had 300 millions of users in 2015, Alibaba processed 12,7 billions of orders in 2015, and Facebook had 1.5 billion users in 2015, each many orders of magnitude below $16^{25}$. Therefore, it is highly unlikely that the rewritten hexadecimal characters will point to valid data.

In contrast, consider the following example.

Legitimate url: http://domain.com/c/2890/

Rewritten url: http://domain.com/c/5153/

In this example, 4 decimal characters have been rewritten. The number of combination of 4 decimal characters is $10^4$=10,000. This number does not exceed the number of users, newsletters, orders and so forth managed by websites that manage even modest traffic. This rewritten URL should not be analyzed, as there is not enough entropy and it is highly probable that there will be an unwanted side effect, even if the side effect experienced was intended for another phishing attack email recipient.

Description of Parameters

FIG. 3 shows a number of identified main types of parameters, according to one embodiment. Several parameter types can be identified in a single side effect URL. That is, side effect URLs may comprise parameters of more than one type. Herein, valid separators for sequences defining parameters include '-' (hyphen) and '' (underscore). A single parameter will always be associated with a single type of parameters. As shown in FIG. 3 and according to one embodiment, the types of parameters identified herein include BASE10, which is a type assigned to parameters that comprise one or more sequences of decimal numbers. Examples of BASE10 parameters include 442957947 and 156349-8890. The LCBASE16 type is a type of parameter assigned to parameters that include one or more sequences of hexadecimal characters, such as 08f912ef567d-afe5. The UCBASE16 is a type given to parameters that include one or more sequences of uppercase hexadecimal characters. Examples of parameters determined to be of the UCBASE16 type include, for example, DE4518F90331DA59 or FE34_541E_092A_9FE4. BASE64 is type for parameters comprising one or more sequences of base 64 encoded data, which allows for a combination of lowercase letters, upper case letters and numbers. An example of a parameter of a side effect URL that would be determined to be of the BASE64 type is AAB1mlGiOp0dJm1YPkmu7G16a. The LCWORDS type is for parameters that include one or more sequences of lowercase letters (such as the parameter dallas) and the UCWORDS type is for parameters that include one or more sequences of uppercase letters (such as the parameter UNSUB_NL). LCMAILADDR is a type for parameters for lowercase email addresses (such as john.doe@gmail.com) and UCEMAILADDR is a type for parameters for upper case email addresses (such as JOHNSMITH1@YAHOO.COM).

Applying the parameter type classification scheme above, the string "WsRt@iO77-8F45", therefore, would not be considered as a parameter because it does not match any of the identified types of parameters. As noted above, a single side effect URL may include a plurality of parameters, which may be of the same or different types, with the caveat that each parameter may be classified as only a single type.

Extract Original Parameters from the Query String of the URL

Parameters may be thought of as a list of variables in the URL. A URL may include several original parameters. In general, parameters are separated from the URL's path using a question mark "?" and are separated from each other (when the URL comprises several parameters) using a "&" (unless sub-parameters are provided inside of a single parameter).

Parameters may be formatted as "key-value pairs." The "key" is the name of the variable, while the "value" is the actual value of the variable. The key goes on the left side of an "=" sign, and the value goes on the right side. Therefore, the parameters may be formatted as:

a series of field and value pairs such as: field1=value1&field2=value2& . . .

a single value: value

According to one embodiment, each value is considered to be a parameter if it matches one of the identified types of parameters. According to one embodiment, the identified types of parameters may include one or more of the following: BASE10, LCBASE16, UCBASE16, BASE64, LCWORDS, UCWORDS, LCEMAILADDR, UCEMAILADDR. Other types of parameters may be provided.

FIG. 4 is a table showing an example of a side effect URL. In this example, the side effect URL is:
  http://domain.com/
?p=unsubscribe&user=442957947&nl=59840501

Examination of this side effect URL reveals a series three field and value pairs in the query string; namely:
  Field and value pair 1: p=unsubscribe
  Field and value pair 2: user=442957947
  Field and value pair 3: nl=59840501

Examination of the value for the field and value pair 1 shows that the value is a sequence of lowercase letters, meaning that the value may be considered to be an original parameter of the LCWORDS type, as indicated in the first row of the left-hand column in FIG. 4. Similarly, examination of the value for the field and value pair 2 shows that the value is a sequence of base 10 numbers, meaning that the value may be considered to be a side effect URL original parameter of the BASE10 type, as indicated in the second row of the left-hand column in FIG. 4. Lastly, examination of the value for the field and value pair 3 shows that the value is also a sequence of decimal numbers, meaning that the value may also be considered to be a side effect URL original parameter of the BASE10 type, as indicated in the second row of the left-hand column in FIG. 4. Therefore, the three original parameters of the side effect URL . . .
  http://domain.com/
?p=unsubscribe&user=442957947&nl=59840501 . . . are of the LCWORDS, BASE10 and BASE10 types.

FIG. 5 is a table showing an example of a side effect URL having a single value in the query string. Here, the side effect URL is
  http://domain.com/e/t/?cM3CUsu4Rie0

Examination of single original parameter of this side effect URL reveals a single value; namely cM3CUsu4Rie0. This value is determined to be a combination of lowercase letters, uppercase letters and numbers, which matches the BASE64 parameter type, a type for values of sequences of base 64 encoded data, as shown in the left-hand column of FIG. 5.

Extract Original Parameters from the Path of the URL

The use of the URL path to pass parameters is a common practice in web development. The path (or stem) in a URL may be thought of as being similar to the file path for a file on a computer. The path often features a hierarchical structure that uses "/"s as separators of the elements of the path. The path may include a filename, such as index.htm, products.php, about.html and the like. Each unique path may represent either a page of content or a content template that then uses parameters to update the actual content, a frequent occurrence in side effect URLs. The end of a path is delimited by a question mark "?". However, there is no norm defined and it can be very difficult to figure out if a URL path element is a parameter or a regular directory.

In the discussion of one exemplary embodiment below, the identification and extraction of original parameters in the URL path is limited, for simplicity of illustration only, to the following parameter types: BASE10, LCBASE16, UCBASE16, BASE64, which are common in URL paths.

According to one embodiment, additional constraints may be imposed such as, for example:
  The parameter length must be at least URL_PATH_PARAMETER_MIN_LENGTH (configurable parameter, default value is 8), and
  The statistical distribution of uppercase letters, lowercase letters and numbers must be normal, according to the type of parameter. A configurable error margin may be allowed, to allow for some deviation from the norm, for the determined parameter type.
  For example, the original parameter
  abfedfaaedfefdc1 will not be considered as a LCBASE16 parameter because there is a statistical under-representation of numbers, as compared to statistically-normal distribution of numbers in a base 16 string.
  1T1GyoRtwOd2S77qH9HfYaaw will be considered as a BASE64 original parameter because the statistical distribution of uppercase letters, lowercase letters and numbers is determined to be within a range that is considered to be normal for a base 64 string.

FIG. 6 is a table showing an example URL having two parameters in the path. As shown therein, the URL being examined is:

https://domain.com/sh/ywkb9d5j0u143zd/ AAB1mlGiOp0dJm1YPkmu7G16a

This side effect URL has two original parameters; namely:

ywkb9d5j0u143zd, and

AB1mlGiOp0dJm1YPkmu7G16a

The first original parameter exhibits a distribution of lowercase letters and numbers consistent with a base 64 sequence and is, therefore, determined to be of the BASE64 parameter type. The second original parameter also exhibits a distribution of lowercase letters and numbers that is within the expected distribution (within a selectable margin of error) for strings of the BASE64 parameter type. These identified and typed original parameters may now be, according to one embodiment, isolated, extracted and transformed into transformed parameters. The URL may then, according to one embodiment, be reconstructed or reassembled, substituting the transformed parameters for the original parameters in the side effect URL. As the transformed parameters have the same format as the original parameters in the side effect URL, they will be accepted by the phishing server. On the other hand, a legitimate sending server would likely return an error (such as an HTTP 4xx error). However, since the parameters have been transformed, the transformed parameters will not point or be associated with any data related to the intended recipient of the side effect URL. This renders the reassembled URL effectively harmless; that is, free from the unwanted side effects associated with the original URL.

Transform Parameters

The identified and typed original parameters of a side effect URL may be transformed, according to one embodiment, according to a number of parameter transformation rules. The transformation rules applied to the original parameters may be dependent upon the identified type of the parameter.

FIG. 7 is a table that illustrates a plurality of parameter transformation rules, according to one embodiment. As shown therein, for decimal number-only original parameters identified to be of the BASE10 type, a parameter transformation rule may be to replace each number by a random number. Therefore, the identified and extracted BASE10 parameter 156349-8890 in the side effect URL may be transformed into 780034-9134, in which each number has been replaced by a random number, which may be the same or a different number. Alternatively, the parameter transformation rule for BASE10-identified original parameters may include other arithmetical operations and/or substitutions. For extracted original parameters that are identified as being hexadecimal sequences (of the LCBASE16 type), the parameter transformation rule may be to replace each lowercase hexadecimal character by a random lowercase hexadecimal character, which replaced hexadecimal character may be the same or a different hexadecimal character as the original. In this manner, the exemplary extracted LCBASE16 original parameter 08f912ef567d-afe5 may be transformed, according to the parameter transformation rule for LCBASE16-identified parameters, as transformed parameter e6782ad3210d-e450. Alternatively, the parameter transformation rule for LCBASE16-identified parameters may include other arithmetical operations and/or substitutions.

For original parameters identified as being of the UCBASE16 type, the parameter transformation rule, according to one embodiment, may be to replace each uppercase hexadecimal character by a random uppercase hexadecimal character. In this manner, the UCBASE16-identified original parameter DE4518F90331DA59 may be rewritten as and replaced with the sequence F4509EB673AEF891. As a result, one or more of the characters may be the same or different hexadecimal characters. According to other embodiments, the parameter transformation rule for UCBASE16-identified parameters may include other arithmetical operations and/or substitutions. In the fourth row of FIG. 7, the BASE64-identified original parameter AAB1mlGiOp0dJm1YPkmu7G16a may be rewritten, according to a parameter transformation rule for BASE64 parameters, to the transformed parameter we6RtG9euI9OPwZ7gtRyyAP90. This may be carried out, according to one embodiment, by replacing each lowercase letter, uppercase letter and number by a random lowercase letter, a random uppercase letter and a random number, respectively. As a result, one or more of the lowercase characters, uppercase characters and numbers may be replaced with the same or different lowercase letters, uppercase letters and random numbers, respectively. According to other embodiments, the parameter transformation rule for BASE64-identified parameters may include other arithmetical operations and/or substitutions.

As shown in FIG. 7, original parameters identified as being of the LCWORDS type may be replaced, according to the parameter transformation rule for LCWORDS-identified parameters, by a sequence of random lowercase letters. In this manner, the original parameter dallas may be replaced by the random sequence of lowercase letters, to generate the transformed parameter ernqzw. As a result, one or more of the lowercase characters of the identified and extracted parameter may be replaced with the same or different lowercase letters. It is to be noted that the substitutions herein may, but need not be, one-to-one substitutions. However, in the interest of having the transformed parameter have the same format as the original parameter in the side effect URL, a one-to-one substitution may be implemented. In the sixth row of FIG. 7, the UCWORDS-identified original parameter UNSUB_NL may be rewritten, according to a parameter transformation rule for UCWORDS parameters, to the transformed parameter YNHJA_QQ. This may be carried out, according to one embodiment, by replacing each uppercase letter by a random uppercase letter. As a result, one or more of the uppercase characters of the extracted parameter may be replaced with the same or different uppercase letters. According to other embodiments, the parameter transformation rule for UCWORDS-identified original parameters may include other operations and/or substitutions.

For side effect URL original parameters that are identified, extracted and typed to be of the LCEMAILADDR type, a parameter transformation rule may, according to one embodiment, specify that each lowercase letter be replaced by a random lowercase letter. One exception, according to one embodiment, is the Top Level Domain (TLD). In this manner, .com email addresses stay .com email addresses and .edu email address remain .edu email addresses. The local part and the domain part may be subjected to the transformation dictated by the parameter transformation rule. Alternatively, only one of the local and domain parts may be transformed, according to the parameter transformation rule. Accordingly, the LCEMAILADDR-identified original parameter john.doe@gmail.com may be transformed to the transformed parameter rtax.erk@wzppo.com, in which the characters making up both local part and the domain have been replaced with random lowercase characters. Note that the TLD .com of the email address was kept intact.

Similarly, for side effect URL original parameters that are identified, extracted and typed to be of the UCE-MAILADDR type, a parameter transformation rule may, according to one embodiment, specify that each uppercase letter be replaced by a random uppercase letter. One exception, according to one embodiment, is the TLD. The local part and the domain part may be subjected to the transformation dictated by the parameter transformation rule. Alternatively, only one of the local and domain parts may be transformed, according to the parameter transformation rule. Accordingly, the UCEMAILADDR-identified original parameter JOHNSMITH1@YAHOO.COM may be transformed to the transformed parameter IKPQEERGC1@SIKAP.COM, in which the characters making up both local part and the domain have been replaced with random uppercase characters. Note that the TLD .com of the email address was again kept intact. For both LCEMAILADDR-identified parameters and UCE-MAILADDR-identified original parameters, one or more of the lower and uppercase characters of the extracted parameter may be replaced with the same or different lower and uppercase letters, respectively. According to other embodiments, either or both of the parameter transformation rules for LCEMAILADDR and UCEMAILADDR-identified original parameters may include other operations and/or substitutions.

Compute Entropy

As the variously type-identified identified and extracted side effect URL parameters are rewritten, one embodiment may comprise counting the number of transformations made. According to one embodiment, for each transformation and/or substitution made to a character of a parameter, a count may be incremented. According to one embodiment, as long as the number of transformations (the count) is greater than or equal to a predetermined minimum transformation criterion (a MIN_TRANSFORMATIONS_THRESHOLD variable, for example), the transformed parameter may be considered to have enough entropy, as defined herein. This threshold variable may be configurable, and may be configured with a default value of 16, for example.

FIG. 8 is a flowchart illustrating aspects of a method, according to one embodiment. As shown therein block B81 calls for receiving an electronic message over a computer network, the electronic message containing a uniform resource locator (URL). In one embodiment, the electronic message may include an email containing a URL and the computer network may include, but is not limited to a Local Area Network (LAN), the Internet or some other Wide Area Network (WAN). As shown in B82, the URL in the received electronic message may then be parsed one or more original parameters may be identified therein. Herein, "original parameters" include the unmodified parameters identified in the parsed URL contained in the received electronic message. As shown at B83, the type of the identified original parameter(s) may then be determined. The number of types of parameters may be limited, and may include one or more of the parameter types shown in FIG. 3, for example.

According to one embodiment, the identified original parameter(s) may then be transformed according to one of a plurality of parameter transformation rules selected according to the determined type. The application of the selected parameter transformation rule to the original parameter(s) generates one or more transformed parameters. It is to be noted that more than one parameters may be present in a given URL. Moreover, not all parameters contained in a URL need be of the same type. Therefore, it follows that more than one parameter transformation rule may be applied to the identified parameters of the URL. However, only one parameter transformation rule may be applied to any one of the original parameters identified in the URL in the received electronic message.

As shown at B85, the URL of the received electronic message may then be reassembled using the transformed parameter(s) in place of the original parameter(s) of the URL. In B86, according to one embodiment, it may be determined whether the reassembled URL meets predetermined minimum criterion. If not (NO branch of B86), the website pointed to by the URL is not accessed and/or further analyzed, as shown at B87. If, however, the reassembled URL does meet predetermined minimum criterion, the website pointed to by the reassembled URL may be accessed and analyzed, to determine whether the accessed website is, in fact, a side effect URL, as shown at B88. This may be determined by observing the response of the URL to the transformed parameter(s) passed thereto by the reassembled URL.

According to one embodiment, the minimum criterion may include a predetermined minimum number of transformations carried out original parameter(s) to generate the transformed parameter(s). As noted above, this minimum number of transformations (a quantification of "enough entropy") may be initially set to 16, although such a default value may be adjusted at will. The original parameter(s) may be located in a query string and/or a path of the URL in the received electronic message. The plurality of predetermined types of parameters may include, for example, one or more of:

decimal numbers,
lowercase hexadecimal characters,
uppercase hexadecimal characters,
base 64 characters,
lowercase letters,
uppercase letters,
lowercase email addresses and
uppercase email addresses.

According to one embodiment, one or more of the parameter transformation rules may specify to replace each element (e.g., character or group of characters) of an original parameter to which the parameter transformation rule is applied with a random element (e.g., character or group of characters) of the same type. One or more of the parameter transformation rules may, according to one embodiment, specify to replace each element (e.g., character or group of characters) of an original parameter to which the parameter transformation rule is applied with a replacement element (e.g., character or group of characters), determined according to a predetermined operation. The type of the identified original parameter(s) may only be determined, according to one embodiment, when 1) the length of the original parameter being typed is at least a predetermined minimum length; and/or 2) the statistical distribution of lowercase letters, uppercase letters and/or numbers of an original parameter being typed is consistent with normal distributions of lowercase letters, uppercase letters and/or numbers for sequences of the determined type.

A selectable margin of error may be applied to the statistical distribution for each of the plurality of types of parameters, to allow for deviations from a predetermined "normal" or expected distribution of characters in each type.

The response of the accessed website to the transformed parameter(s) may then be analyzed to determine whether the URL may be, in fact, a side effect URL.

Figure 9A:
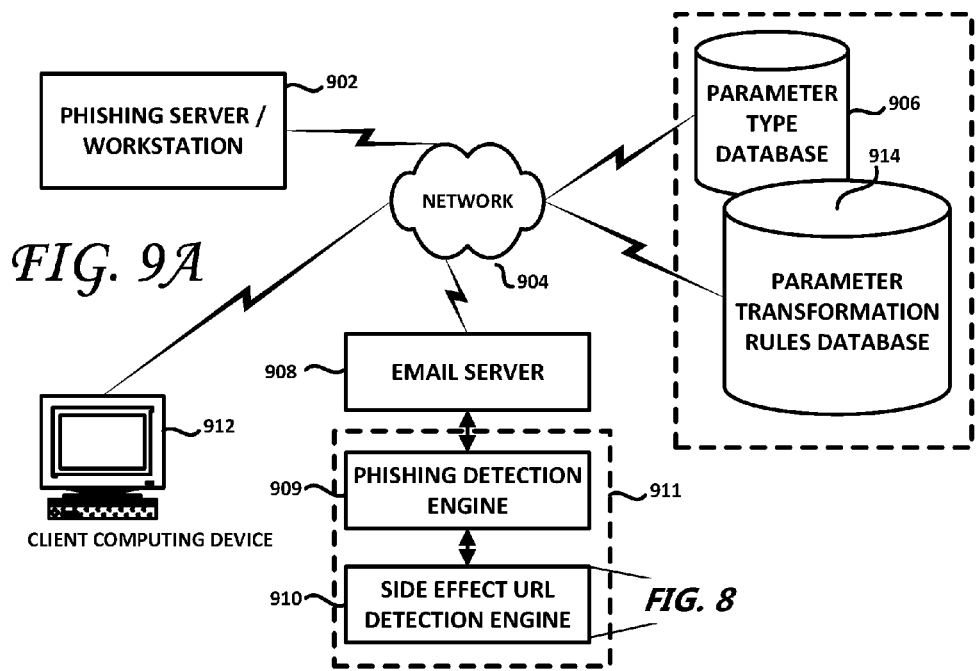
FIG. 9A is a system configured according to one embodiment.

FIG. 9A is a block diagram of a computer system configured for side effect URL detection, according to one embodiment. As shown therein, a phishing email server or workstation 902 (not part of the present side effect URL detection system, per se) may be coupled to a network (including, for example, a LAN or a WAN including the Internet) 904, and, indirectly, to a client computing device 912's email server 908. The email server 908 may be configured to receive an electronic message such as an email containing a URL, that may or may not be a side effect URL, on behalf of the client computing device 912 and provide access thereto. A database 906 of parameter types may be coupled to the network 904, as may be a parameter transformation rules database 914. The databases 906, 914 may be a single database, or the parameter types and parameter transformation rules may simply be hard-coded in the side effect URL detection engine 910. The side effect URL detection engine may be coupled to or incorporated within, the email server 908. Alternatively, some or all of the functionality of the present side effect URL detection engine 910 may be coupled to or incorporated within the client computing device 912.

Alternatively still, the functionality of the side effect URL detection engine 910 may be distributed across both client computing device 912 and the email server 908. According to one embodiment, the side effect URL detection engine 910 may be configured to carry out the functionality and methods described herein above and, in particular, with reference to FIG. 8.

As shown in FIG. 9A, the side effect URL detection engine 910 may be coupled to, or may form part of, a phishing detection engine 909. The phishing detection engine 909 may be structured to carry out, for example, the functionality disclosed in the above-listed commonly-assigned U.S. application Ser. No. 14/542,939 filed on Nov. 17, 2014 entitled "Methods and Systems for Phishing Detection" and/or U.S. application Ser. No. 14/861,846 filed on Sep. 22, 2015 entitled "Detecting and Thwarting Spear Phishing Attacks in Electronic Messages" and/or U.S. application Ser. No. 15/063,340 filed on Mar. 7, 2016 entitled "Methods and Devices to Thwart Email Display Name Impersonation". According to embodiments, the detection engines 909 and 910 may be independent detection engines or may represent different aspects of a same phishing detection engine having the functionality described herein and in the above-listed disclosures.

Figure 9B:
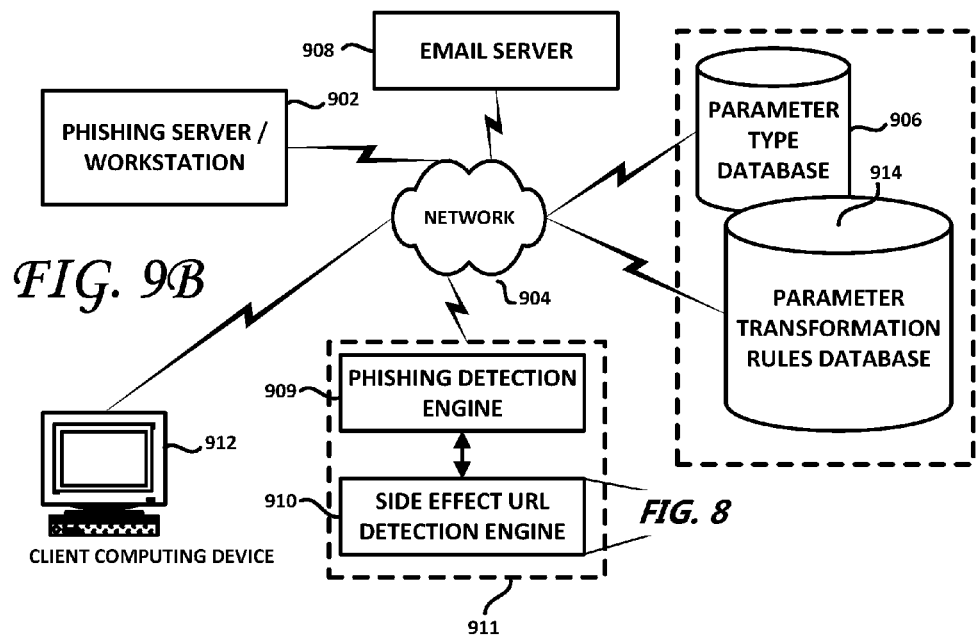
FIG. 9B is a system configured according to one embodiment.

In the embodiment shown in FIG. 9A, the phishing detection engine 909 and/or the side effect URL detection engine may be disposed behind the email server 908 and isolated from the network 904. In the embodiment shown in FIG. 9B, the phishing detection engine 909 and/or the side effect URL detection engine may be coupled to the network 904 directly, and may be independent of the email server 908.

Any reference to an engine in the present specification refers, generally, to a program (or group of programs) that perform a particular function or series of functions that may be related to functions executed by other programs (e.g., the engine may perform a particular function in response to another program or may cause another program to execute its own function). Engines may be implemented in software and/or hardware as in the context of an appropriate hardware device such as an algorithm embedded in a processor or application-specific integrated circuit.

Figure 10:
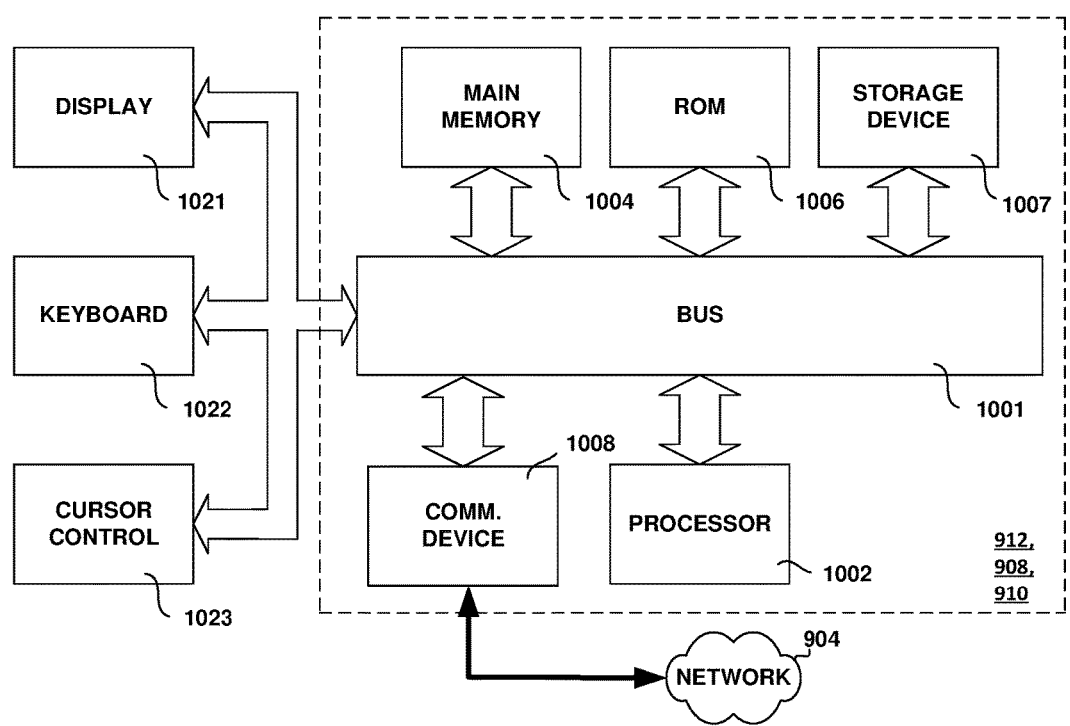
FIG. 10 is a block diagram of a computing device configured according to one embodiment.

FIG. 10 illustrates a block diagram of a computing device such as client computing device 912, email (electronic message) server 908 or side effect URL detection engine 910 upon and with which embodiments may be implemented. Computing device 912, 908, 910 may include a bus 1001 or other communication mechanism for communicating information, and one or more processors 1002 coupled with bus 1001 for processing information. Computing device 912, 908, 910 may further comprise a random access memory (RAM) or other dynamic storage device 1004 (referred to as main memory), coupled to bus 1001 for storing information and instructions to be executed by processor(s) 1002. Main memory (tangible and non-transitory, which terms, herein, exclude signals per se and waveforms) 1004 also may be used for storing temporary variables or other intermediate information during execution of instructions by processor 1002. Computing device 912, 908, 910 may also may include a read only memory (ROM) and/or other static storage device 1006 coupled to bus 1001 for storing static information and instructions for processor(s) 1002. A data storage device 1007, such as a magnetic disk and/or solid state data storage device may be coupled to bus 1001 for storing information and instructions—such as would be required to carry out the functionality shown and disclosed relative to FIGS. 1-9. The computing device 912, 908, 910 may also be coupled via the bus 1001 to a display device 1021 for displaying information to a computer user. An alphanumeric input device 1022, including alphanumeric and other keys, may be coupled to bus 1001 for communicating information and command selections to processor(s) 1002. Another type of user input device is cursor control 1023, such as a mouse, a trackball, or cursor direction keys for communicating direction information and command selections to processor(s) 1002 and for controlling cursor movement on display 1021. The computing device 912, 908, 910 may be coupled, via a communication interface (e.g., modem, network interface card or NIC) to the network 904.

Embodiments of the present invention are related to the use of computing device 912, 908, 910 to detect whether a received electronic message may be illegitimate as including a spear phishing attack. According to one embodiment, the methods and systems described herein may be provided by one or more computing devices 912, 908, 910 in response to processor(s) 1002 executing sequences of instructions contained in memory 1004. Such instructions may be read into memory 1004 from another computer-readable medium, such as data storage device 1007. Execution of the sequences of instructions contained in memory 1004 causes processor(s) 1002 to perform the steps and have the functionality described herein. In alternative embodiments, hard-wired circuitry may be used in place of or in combination with software instructions to implement the described embodiments. Thus, embodiments are not limited to any specific combination of hardware circuitry and software. Indeed, it should be understood by those skilled in the art that any suitable computer system may implement the functionality described herein. The computing devices may include one or a plurality of microprocessors working to perform the desired functions. In one embodiment, the instructions executed by the microprocessor or microprocessors are operable to cause the microprocessor(s) to perform the steps described herein. The instructions may be stored in any computer-readable medium. In one embodiment, they may be stored on a non-volatile semiconductor memory external to the microprocessor, or integrated with the microprocessor. In another embodiment, the instructions may be stored on a disk and read into a volatile semiconductor memory before execution by the microprocessor.

While certain example embodiments have been described, these embodiments have been presented by way of example only, and are not intended to limit the scope of the embodiments disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

The invention claimed is:

1. A computer-implemented method, comprising:
receiving and storing an electronic message, in a memory of a computing device coupled to a computer network, the electronic message containing a uniform resource locator (URL);
parsing the URL in the electronic message stored in the memory of the computing device and identifying at least one original parameter in the URL, the at least one original parameter comprising a sequence of characters;
determining a length of the at least one original parameter;
determining a statistical distribution of lowercase letters, uppercase letters and/or numbers of the at least one original parameter;
determining a type of the identified at least one original parameter, the determined type being one of a plurality of predetermined types of parameters only when the length of the at least one original parameter is determined to be at least a predetermined minimum length and when the statistical distribution is determined to be consistent with normal distributions of such lowercase letters, uppercase letters and/or numbers;
transforming the identified at least one original parameter according to one of a plurality of parameter transformation rules selected according to the determined type to generate at least one transformed parameter;
reassembling the URL by substituting the at least one transformed parameter for the at least one original parameter;
accessing, over the computer network, the website pointed to by the reassembled URL using the at least one transformed parameter if the reassembled URL meets a predetermined minimum criterion,
foregoing accessing the reassembled URL if the reassembled URL does not meet the predetermined minimum criterion; and
analyzing a response of the accessed website to the at least one transformed parameters to determine whether the URL is a side effect URL.

2. The computer-implemented method of claim 1, wherein the minimum criterion includes a predetermined minimum of transformations carried out on the at least one original parameter to generate the at least one transformed parameter.

3. The computer-implemented method of claim 1, wherein the at least one original parameter is located in at least one of a query string and a path of the URL.

4. The computer-implemented method of claim 1, wherein the plurality of predetermined types of parameters include at least some of decimal numbers, lowercase hexadecimal characters, uppercase hexadecimal characters, base 64 characters, lowercase letters, uppercase letters, lowercase email addresses and uppercase email addresses.

5. The computer-implemented method of claim 4, wherein at least one of the parameter transformation rules specifies to replace each character of an original parameter to which the parameter transformation rule is applied with a random character of a same type.

6. The computer-implemented method of claim 4, wherein at least one of the parameter transformation rules specifies to replace each character of an original parameter to which the parameter transformation rule is applied with a replacement character determined according to a predetermined operation.

7. The computer-implemented method of claim 1, further including applying a selectable margin of error to the statistical distribution for each of the plurality of types of parameters.

8. A computing device configured to determine whether a received electronic message is suspect, comprising:
at least one processor;
at least one data storage device coupled to the at least one processor;
a network interface coupled to the at least one processor and to a computer network;
a plurality of processes spawned by said at least one processor, the processes including processing logic for:
using the network interface, receiving an electronic message;
storing the received electronic message in the data storage device, the stored electronic message containing a uniform resource locator (URL);
parsing the URL in the electronic message stored in the data storage device and identifying at least one original parameter in the URL, the at least one original parameter comprising a sequence of characters;
determining a length of the at least one original parameter;
determining a statistical distribution of lowercase letters, uppercase letters and/or numbers of the at least one original parameter;
determining a type of the identified at least one original parameter, the determined type being one of a plurality of predetermined types of parameters only when the length of the at least one original parameter is determined to be at least a predetermined minimum length and when the statistical distribution is determined to be consistent with normal distributions of such lowercase letters, uppercase letters and/or numbers;
transforming the identified at least one original parameter according to one of a plurality of parameter transformation rules selected according to the determined type to generate at least one transformed parameter;
reassembling the URL by substituting the at least one transformed parameter for the at least one original parameter;
accessing, over the computer network, the website pointed to by the reassembled URL using the at least one transformed parameter if the reassembled URL meets a predetermined minimum criterion, and
foregoing accessing the reassembled URL if the reassembled URL does not meet the predetermined minimum criterion; and
analyzing a response of the accessed website to the at least one transformed parameters to determine whether the URL is a side effect URL.

9. The computing device of claim 8, wherein the minimum criterion includes a predetermined minimum of transformations carried out on the at least one original parameter to generate the at least one transformed parameter.

10. The computing device of claim 8, wherein the at least one original parameter is located in at least one of a query string and a path of the URL.

11. The computing device of claim 8, wherein the plurality of predetermined types of parameters include at least some of decimal numbers, lowercase hexadecimal characters, uppercase hexadecimal characters, base 64 characters, lowercase letters, uppercase letters, lowercase email addresses and uppercase email addresses.

12. The computing device of claim 11, wherein at least one of the parameter transformation rules specifies to replace each character of an original parameter to which the parameter transformation rule is applied with a random character of a same type.

13. The computing device of claim 11, wherein at least one of the parameter transformation rules specifies to replace each character of an original parameter to which the parameter transformation rule is applied with a replacement character determined according to a predetermined operation.

14. The computing device of claim 8, further including applying a selectable margin of error to the statistical distribution for each of the plurality of types of parameters.

15. A tangible, non-transitory machine-readable data storage device having data stored thereon representing sequences of instructions which, when executed by a computing device, cause the computing device to:
receive and storing an electronic message, in a memory of a computing device coupled to a computer network, the electronic message containing a uniform resource locator (URL);
parse the URL in the electronic message stored in the memory of the computing device and identify at least one original parameter in the URL, the at least one original parameter comprising a sequence of characters;
determine a length of the at least one original parameter;
determine a statistical distribution of lowercase letters, uppercase letters and/or numbers of the at least one original parameter;
determine a type of the identified at least one original parameter, the determined type being one of a plurality of predetermined types of parameters only when the length of the at least one original parameter is determined to be at least a predetermined minimum length and when the statistical distribution is determined to be consistent with normal distributions of such lowercase letters, uppercase letters and/or numbers;
transform the identified at least one original parameter according to one of a plurality of parameter transformation rules selected according to the determined type to generate at least one transformed parameter;
reassemble the URL by substituting the at least one transformed parameter for the at least one original parameter;
access, over the computer network, the website pointed to by the reassembled URL using the at least one transformed parameter if the reassembled URL meets a predetermined minimum criterion, and
forego accessing the reassembled URL if the reassembled URL does not meet the predetermined minimum criterion; and
analyzing a response of the accessed website to the at least one transformed parameters to determine whether the URL is a side effect URL.

16. The tangible, non-transitory machine-readable data storage device of claim 15, wherein the minimum criterion includes a predetermined minimum of transformations carried out on the at least one original parameter to generate the at least one transformed parameter.

17. The tangible, non-transitory machine-readable data storage device of claim 15, wherein the at least one original parameter is located in at least one of a query string and a path of the URL.

18. The tangible, non-transitory machine-readable data storage device of claim 15, wherein the plurality of predetermined types of parameters include at least some of decimal numbers, lowercase hexadecimal characters, uppercase hexadecimal characters, base 64 characters, lowercase letters, uppercase letters, lowercase email addresses and uppercase email addresses.

19. The tangible, non-transitory machine-readable data storage device of claim 18, wherein at least one of the parameter transformation rules specifies to replace each character of an original parameter to which the parameter transformation rule is applied with a random character of a same type.

20. The tangible, non-transitory machine-readable data storage device of claim 18, wherein at least one of the parameter transformation rules specifies to replace each character of an original parameter to which the parameter transformation rule is applied with a replacement character determined according to a predetermined operation.

21. The tangible, non-transitory machine-readable data storage device of claim 18, further including sequences of instructions which, when executed by the computing device, cause the computing device to apply a selectable margin of error to the statistical distribution for each of the plurality of types of parameters.

* * * * *